United States Patent [19]

Repella

[11] Patent Number: 4,526,386
[45] Date of Patent: Jul. 2, 1985

[54] NESTED SERPENTINE SEAL ASSEMBLY
[75] Inventor: James A. Repella, Berkley, Mich.
[73] Assignee: Microdot Inc., Darien, Conn.
[21] Appl. No.: 603,147
[22] Filed: Apr. 23, 1984
[51] Int. Cl.³ .............................................. F16J 15/18
[52] U.S. Cl. .............................. 277/188 R; 277/213; 277/216
[58] Field of Search .............. 277/165, 188 R, 188 A, 277/203, 204, 216, 213, 220

[56] References Cited
U.S. PATENT DOCUMENTS

| Re. 18,102 | 6/1931 | Bowers | 277/213 |
|---|---|---|---|
| 1,500,705 | 7/1924 | Heslewood et al. | 277/188 R |
| 2,615,769 | 10/1952 | Barnes et al. | 277/188 R X |
| 2,973,978 | 3/1961 | Oppenheim | 277/188 A |
| 3,118,682 | 1/1964 | Fredd | 277/188 R X |

FOREIGN PATENT DOCUMENTS

| 438752 | 11/1935 | United Kingdom | 277/213 |
|---|---|---|---|
| 767858 | 2/1957 | United Kingdom | 277/188 A |
| 1041916 | 9/1966 | United Kingdom | 277/188 A |

Primary Examiner—Robert S. Ward
Attorney, Agent, or Firm—Lyman R. Lyon

[57] ABSTRACT

A piston seal assembly comprises a seal element of relatively hard material to resist extrusion. The element is of serpentine configuration to facilitate radial expansion. Backup elements nest with the seal element to stabilize the element within a complementary piston groove.

3 Claims, 5 Drawing Figures

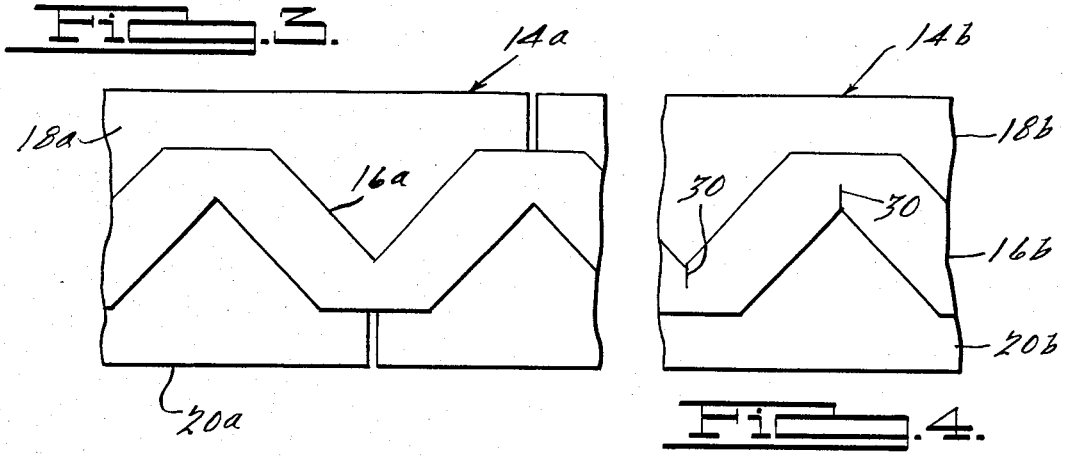
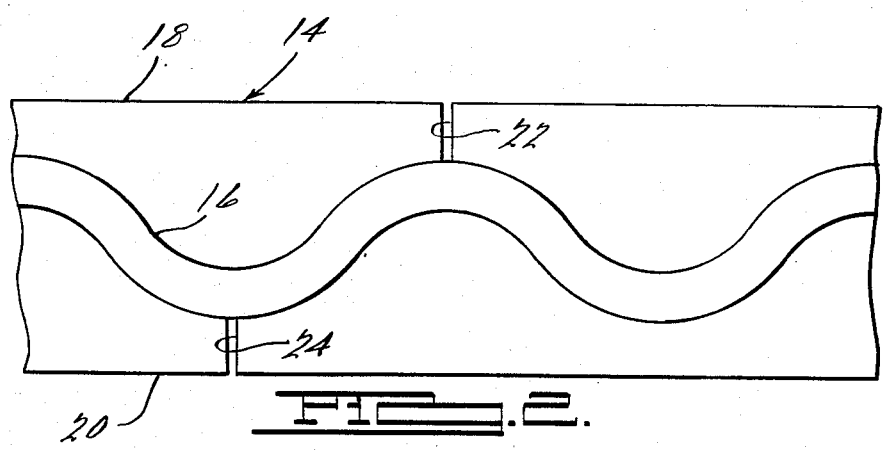
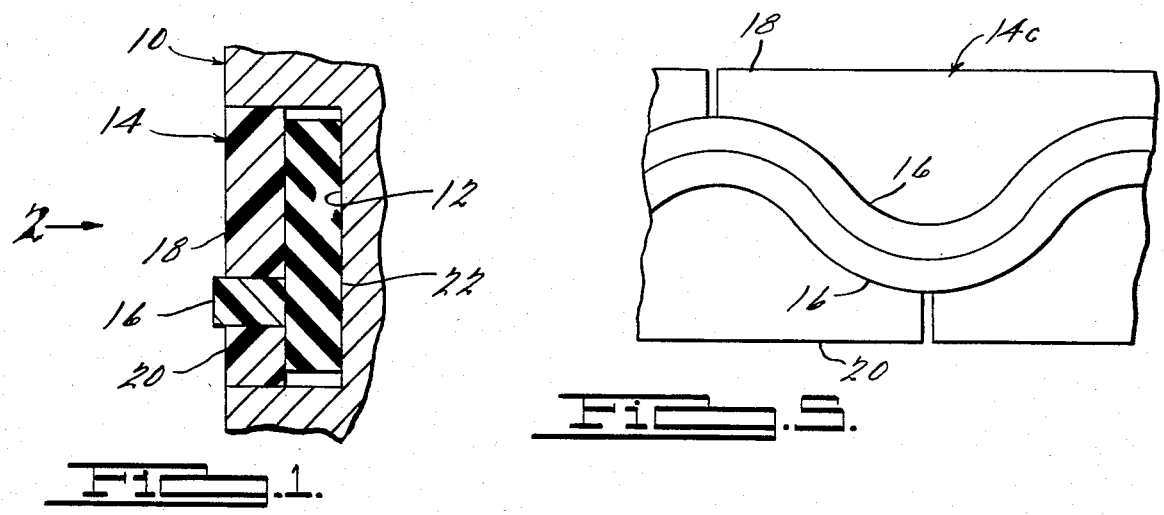

NESTED SERPENTINE SEAL ASSEMBLY

BACKGROUND OF THE INVENTION

Piston or rod seals are often subject to a design requirement that materially reduces life expectancy of the seal, namely, that the seal reciprocate over a port that permits radial extrusion of the seal element into the port with resultant tearing or abrasion of the seal. This problem has heretofore been solved by fabricating the seal element from relatively hard, non-extrudable material. However, since such materials are relatively inelastic, such known seals must be split to accommodate the radial expansion necessary for assembly on the piston. Obviously, splitting of the seal element induces leakage thereof.

SUMMARY OF THE INVENTION

The present invention relates to a seal assembly suitable for use on a piston or rod that is reciprocable over ports or the like. The entire periphery of a seal element of the seal assembly maintains uninterrupted sealing contact with a cylinder or rod to insure sealing. The seal element is expandable radially to accommodate assembly.

BRIEF DESCRIPTION OF THE DRAWINGS

FIG. 1 is a fragmentary cross section through a seal assembly of the instant invention shown mounted on a piston;

FIG. 2 is a view taken in the direction of the arrow 2 of FIG. 1;

FIG. 3 is a view, similar to FIG. 2, of a modified form of the seal;

FIG. 4 is a view similar to FIG. 3 showing another embodiment of the invention; and FIG. 5 is a view, similar to FIG. 2, showing stacked seal elements.

DETAILED DESCRIPTION OF THE PREFERRED EMBODIMENT OF THE INVENTION

As shown in FIG. 1, a piston 10 has a circumferential groove 12 therein for the acceptance of a seal assembly 14. The seal assembly 14 comprises a seal element 16, a pair of support elements 18 and 20 and an expander ring 22. The seal element 16 and support elements 18 and 20 are made from relatively hard inelastic material, for example, reinforced nylon. Expander element 22 is made from resilient material, for example, nitrile rubber.

As best seen in FIG. 2, the seal element 16 is of serpentine configuration defined by a plurality of circumferentially spaced undulations. The support rings 18 and 20 have undulations on axially inner edges complementary to those of the seal element 16 so as to accept the seal element 16 in nesting relationship. The axially outer edges of the support rings 18 and 20 are straight so to be positively positionable against juxtaposed edges of the groove 12 of the piston 10.

It is to be noted that the support elements 18 and 20 have splits 22 and 24 therein, respectively, to facilitate radial expansion and assembly within the groove 12 in the piston 10.

In accordance with one feature of the instant invention, the undulations of the seal element 16 permit a slight circumferential expansion thereof so that the seal element can be assembled over the piston 10 without requiring a slit to accommodate such expansion.

As seen in FIG. 3, a seal assembly 14a comprises a seal element 16a and a pair of support elements 18a and 20a. The seal element 16a and support elements 18a and 20a are made from relatively hard material, for example reinforced nylon. The seal element 16a, like the element 16, is of generally serpentine configuration but is distinguishable therefrom by a plurality of circumferentially spaced straight sided undulations. The support rings 18a and 20a have undulations complementary to those of the seal element 16a so as to accept the seal element 16a in nesting relationship.

As seen in FIG. 4, the seal assembly 14b comprises a seal element 16b and a pair of support elements 18b and 20b. The seal element 16b is of serpentine configuration similar to the seal element 16a but has splits 30 therein to facilitate radial expansion and assembly within the groove 12 in the piston 10.

As seen in FIG. 5, the seal assembly 14c comprises a pair of seal elements 16 and a pair of support elements 18 and 20. The additional seal element 16 is nested with the support elements 18 and 20 and provides additional sealing power to the assembly 14c.

While the preferred embodiment of the invention has been disclosed, it should be appreciated that the invention is susceptible of modification without departing from the scope of the following claims.

I claim:

1. A seal assembly for a grooved circular piston or the like comprising an annular seal element of relatively hard inelastic material, said seal element having undulating axially facing parallel edge portions to facilitate circumferential expansion thereof for assembly in said piston, said seal element having right circular cylindrical radially inner and outer faces for acceptance in said piston groove, a pair of support elements having axially facing undulating edge portions complementary to the undulations of said seal element for assembly therewith in nesting relationship, said support elements having straight edge portions engageable with juxtaposed edges of the groove in said piston, said support elements being disposed on opposite sides of said seal element to stabilize said seal element against axial distortion in said piston groove, and a resilient expander ring disposed radially inwardly of said seal element and support elements.

2. A seal assembly for a grooved circular piston or the like comprising an annular seal element of relatively hard inelastic material, said seal element having undulating axially facing parallel edge portions to facilitate circumferential expansion thereof for assembly in said piston, said seal element having right circular cylindrical radially inner and outer faces for acceptance in said piston groove, and a pair of support elements having axially facing undulating edge portions complementary to the undulations of said seal element for assembly therewith in nesting relationship, said support elements having straight edge portions engageable with juxtaposed edges of the groove in said piston, said support elements being disposed on opposite sides of said seal element to stabilize said seal element against axial distortion in said piston groove, the undulations of said seal element being partially split in the longitudinal direction at their axial extremities to facilitate radial expansion.

3. A seal assembly for a grooved circular piston or the like comprising an annular seal element of relatively hard inelastic material, said seal element having undulating axially facing parallel edge portions to facilitate circumferential expansion thereof for assembly in said piston, said seal element having right circular cylindrical radially inner and outer faces for acceptance in said piston groove, and a pair of support elements having axially facing undulating edge portions complementary to the undulations of said seal element for assembly therewith in nesting relationship, said support elements having straight edge portions engageable with juxtaposed edges of the groove in said piston, said support elements being disposed on opposite sides of said seal element to stabilize said seal element against axial distortion in said piston groove, said seal element being of larger diameter than said support elements.

* * * * *